Oct. 22, 1929.  C. M. MENDELSOHN  1,732,764
IMPLEMENT DISPLAYING AND STORING DEVICE
Filed May 2, 1927
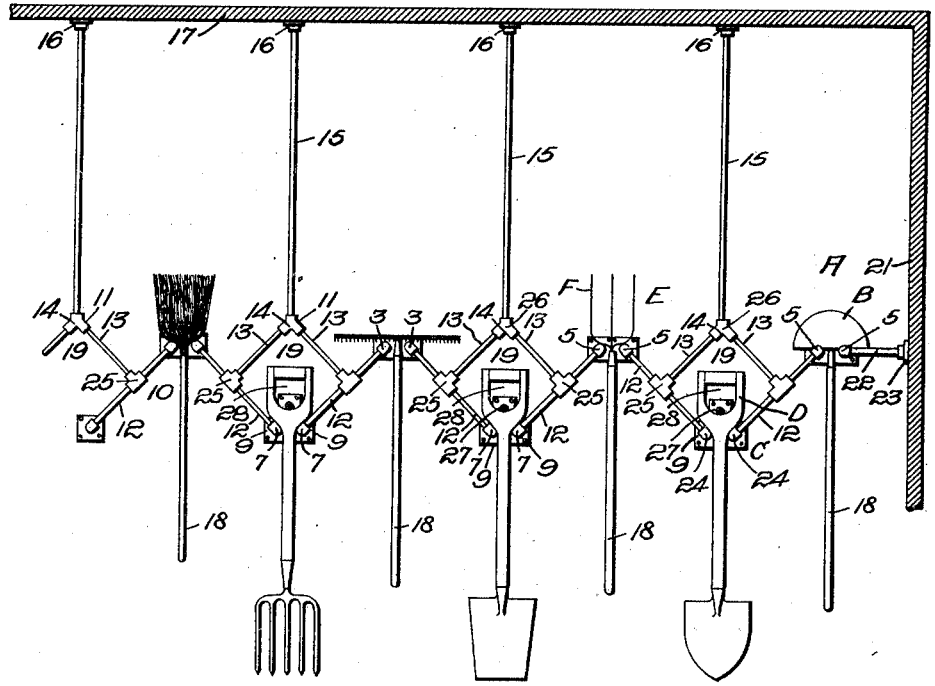
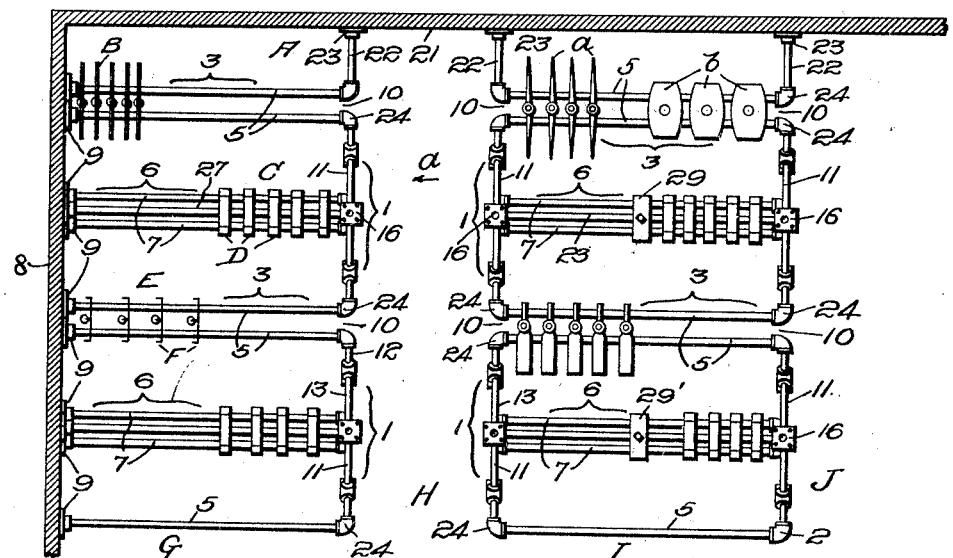
Inventor:
Charles M. Mendelsohn
by Emery, Booth, Janney & Varney
Attys Patented Oct. 22, 1929

1,732,764

UNITED STATES PATENT OFFICE

CHARLES M. MENDELSOHN, OF WALTHAM, MASSACHUSETTS

IMPLEMENT DISPLAYING AND STORING DEVICE

Application filed May 2, 1927. Serial No. 188,070.

My invention aims to provide an improved implement displaying and storing device and in the accompanying drawings is shown an illustrative embodiment of the invention, wherein Fig. 1 is a plan section through a corner of a storeroom showing an arrangement of my device; and Fig. 2 is an elevation of a series of holders viewed in the direction of the arrow $a$ in Fig. 1.

In the particular embodiment of my invention selected for purposes of illustration and shown in the drawings, the implement holders 1 are arranged in the storage or display room so as to provide a series of pairs 3 of parallel bars 5 arranged horizontally and herein in a common plane. Below the above series is a second series of pairs 6 of spaced parallel bars 7 which lie substantially midway between the pairs 3 and in a plane below and substantially parallel with the aforesaid plane.

The bars constituting the pairs 3 and 6 are spaced far enough apart to receive between them the handles of farming implements, garden tools, or like instruments, said tools and implements being supported upon said parallel bars by resting the heads or handles of the same upon said bars, the handles of the tools on the upper series being suspended between those of the lower series. Any number of pairs of bars may be used and their lengths and the number thereof will be determined by the size of the room wherein the implements are to be displayed or stored, and in order to render the same most convenient each pair of parallel supporting bars may be confined to the displaying of but one type of implement. For example, resting upon the pair of supporting bars shown at A, Fig. 1, a number of sod cutters B are shown; on the next pair of bars C are shovels D; from the third pair of bars E a series of forks F are suspended; and so on down the length of the room. In this way, inasmuch as all of the implements on one rack are alike, the first implement in the row will be removed, there being no occasion for attempting to remove an implement farther back in the row.

The two series of pairs of bars may be suspended or supported high enough above the floor of the storeroom to permit people to walk beneath the holders between the tool handles without striking their heads, and this will also provide more or less room below the tools for storing articles or implements which cannot be suspended from the racks. Furthermore, the parallel supporting bars may vary in length and are susceptible of being placed around the walls of the room, or in certain parts thereof, or said bars may be spread throughout the entire room, if the magnitude of the stock warrants it.

In Fig. 1 I have shown an arrangement of holders including a group or row G along one side of the display room, this row being separated by an aisle H from a second row of holders I. Another aisle J is provided on the outer side of said last mentioned row, and this arrangement may be repeated entirely across as well as lengthwise of the room if desired.

The rods of the first row G, which is arranged adjacent to a side wall 8, are herein supported in proper spaced relation by wall plates 9 in which the ends of the bars 5 and 7 are secured, said plates being of such a diameter that when placed side by side and in contact the proper spacing of the bars of each pair will be assured, this spacing being desirably the same for all of the various pairs in the row, so that the erecting of the device will be comparatively simple.

It is desirable to have one end at least of each pair of supporting bars open so that the implements may be freely inserted between the bars or removed when a sale or transfer is to be made. Where a group of the supporting rods are supported at one end upon a wall of the room, as shown in the series G, Fig. 1, the ends of the pairs 3 and 6 of rods along the aisle H will be left open, as shown at 10, so that when a salesman wishes to replenish the stock or remove the implements from the rack or holder he may do so by passing the handles of the implements, which are pointed downward, through the gap or opening 10. Where the parallel bars are arranged in a series away from a side wall, as for example in the series I, both ends of said bars may have openings 10 so that the tools may be inserted or removed at either end and in such a case it will be possible to store two kinds of tools upon one set or pair of parallel bars, see for example the upper end of the aisle 1, wherein I have shown pick axes *a* at one end and mallets or malls *b* at the opposite end, and this method of storing may be followed throughout the series I or in other series which are not secured against a wall.

It is desirable that the holding device of this invention be designed to support substantially all types of hand tools or farming implements and some of these tools have long straight handles while others have short or spade handles. Where tools such as rakes, brooms, forks and the like with relatively large heads and long straight handles are stored, it is desirable that considerable clear space on either side of the supporting bars be provided so that said tools may be placed upon or removed from the rods without turning their heads edgewise. To this end the ends of the bars corresponding to the opening 10 are supported by brackets 11, each bracket herein consisting of upwardly diverging arms 12, the latter carrying at their upper ends one of the bars 5 and at their lower ends one of the bars 7. The arms 12 are connected substantially midway of their ends by lateral members 13 which herein converge to a point 14, where connection is made with a rod 15 suspended from a plate 16 secured to the ceiling 17 of the display room.

By reason of the above arrangement the suspending member 15 of one hanger will be a considerable distance from a similar member 15 of the next hanger. This provides a considerable space on opposite sides of each of the upper pairs 3 of bars so that tools with long or large heads may be inserted between said supporting bars with perfect freedom without necessitating the turning of the head as previously stated. In this case the long straight handles of such tools, as indicated at 18, will hang downwardly between said supporting bar, while the shoulders or lateral portions of the heads thereof will rest upon said bars.

By arranging the arms 12 at an angle to each other and upwardly diverging and supporting these arms by the members 13 attached thereto some distance above the bars 5, considerable space 19 will be provided above and laterally of the bars, permitting the heads of smaller tools or desirably the spade handles of the short handled tools to be inserted or removed through the openings 10 without necessitating the turning of said handles edgewise.

Where the end of a series of hangers terminates adjacent to a wall at right angles to the wall 8, for example the wall or partition 21, the supporting bar 5 adjacent to said wall may be supported by wall supports, herein consisting of a short length of pipe 22 projecting laterally from a wall plate 23 and secured to the end of said bar 5 at the opening 10, the length of the member 22 being sufficient to allow the heads of the tools supported on said pair of bars to overhang without touching the wall 21.

For convenience the upwardly diverging arms 12, the supporting bars 5 and 7, and the members 13 and 15, are all formed of pipe and united by the usual elbows 24, T's 25 and Y's 26.

In supporting implements by their handles as they are generally supported upon the lower bars 7, and particularly where spade handles are used, a third bar 27 may be inserted through the openings 28 of said handles to prevent the latter from turning sideways and dropping down between the bars 7.

The bars 27 may, if desired, be left free, merely resting within the loops of the handles or, as shown herein, they may be supported on a bracket 29 leaving the free ends of said bars which terminate near the brackets 1 free and unsupported or possibly resting upon said handles so that the handles may be slipped thereon or removed without difficulty.

Where one end of each supporting bar is attached by a wall plate to a wall, the corresponding ends of the bars 27 may similarly be secured instead of by bracket 29.

It is to be understood that the invention is not limited to the specific embodiment shown herein.

Claims:

1. In combination, a series of pairs of spaced cooperating supporting members for supporting implements; a second series of spaced cooperating supporting members alternating with said series of pairs and arranged at a different level; and brackets, each adapted to support one of the supporting members of two different pairs of the upper series and both of the supporting members of one of the pairs of said lower series in parallel relation.

2. In combination, a series of pairs of spaced, substantially horizontal supporting members, each pair arranged to support a plurality of implements, a second series of pairs of supporting members alternating with and in a plane below the aforesaid series and arranged to support a plurality of implements; and brackets for carrying said implement supports, each bracket being arranged to support in parallel relation one lower pair of supports and one member of one upper pair together with one member of the next adjacent upper pair of said supports.

3. A displaying and storing device comprising, in combination, a plurality of pairs of spaced supporting bars; and means for carrying said bars including plates along one side at least of said series of bars, the plate of each bar being of predetermined size and arranged to contact with the plate of the other bar of said pair for the purpose of properly spacing said bars.

4. A displaying and storing device comprising a plurality of pairs of spaced cooperating supporting bars lying substantially in a common horizontal plane, a second series of pairs of spaced cooperating supporting bars arranged respectively midway of the pairs of the first series and in a different horizontal plane, and means to carry said supporting bars including brackets consisting of diverging arms each carrying at one end one of the cooperating bars of one plane and at its other end one of the cooperating bars of the other plane.

5. A displaying and storing device comprising a plurality of pairs of spaced supporting bars lying substantially in a common horizontal plane, a second series of pairs of spaced supporting bars arranged respectively midway of the pairs of the first series and in a different horizontal plane, means to carry said supporting bars including brackets consisting of diverging arms each carrying at one end one of the bars of one plane and at its other end one of the bars of the other plane, and means connected substantially central of said arms for supporting the latter.

6. A displaying and storing device comprising a plurality of pairs of spaced supporting bars lying substantially in a common horizontal plane, a second series of pairs of spaced supporting bars arranged respectively midway of the pairs of the first series and in a different horizontal plane, means to carry said supporting bars including brackets consisting of diverging arms each carrying at one end one of the bars of one plane and at its other end one of the bars of the other plane, and means connected substantially central of said arms for supporting the latter from above.

7. A displaying and storing device comprising a plurality of pairs of spaced supporting bars lying substantially in a common horizontal plane, a second series of pairs of spaced supporting bars arranged respectively midway of the pairs of the first series and in a different horizontal plane, means to carry said supporting bars including brackets consisting of diverging arms each carrying at one end one of the bars of one plane and at its other end one of the bars of the other plane, and means for supporting said diverging arms from above so as to provide openings at the ends of the bars of each pair for the reception and removal of implement handles and to provide clear space directly above and laterally of said pairs of bars for the heads or handles of the implements.

8. In a device of the class described, upper and lower pairs of spaced cooperating bars, brackets for supporting both ends of said bars with an opening at each end, and suspending means for each bracket.

9. In a device of the class described, a pair of substantially horizontal spaced bars arranged in pairs for suspending between them spade handled implements, and a third bar arranged above and substantially parallel with said pair of bars and extending through said handles to prevent turning thereof on the supporting bars.

10. In a device of the class described, a series of brackets having upwardly diverging arms, means to support each pair of arms in relatively fixed relation, a pair of supporting bars supported by the lower adjacent ends of said diverging arms in parallel spaced relation for supporting a series of implements therebetween, and a second pair of spaced parallel implement supporting bars supported respectively by the upper adjacent ends of the diverging arms of adjacent brackets.

11. In a device of the class described, a series of brackets each having integral upwardly diverging arms, means to support each bracket at a point between said diverging arms, the upper extremities of said arms each supporting one end of one of a pair of parallel spaced cooperating implement supporting bars, the lower extremities of the arms of each bracket supporting one end of a pair of cooperating spaced implement supporting bars at a lower level and in a different vertical plane from that of the said upper pair of implement supporting bars.

12. An implement display stand comprising two horizontal series of spaced parallel implement supporting bars, the pairs of supporting bars of one of said series being arranged at a different level and staggered relatively to the pairs of bars of the other series, brackets for supporting opposite ends of said bars, each bracket being arranged to support adjacent ends of one lower pair of supporting bars and a corresponding end of one bar of each of the successive pairs of bars of the upper series, and means independently to carry each of said brackets in predetermined spaced relation.

13. An implement display stand comprising two horizontal series of spaced parallel implement supporting bars, the pairs of supporting bars of one of said series being arranged at a different level and staggered relatively to the pairs of bars of the other series, supporting brackets for opposite ends of said implement supporting bars, each bracket carrying like ends of one pair of bars of the lower series, and the corresponding ends of one of the bars of two successive pairs of bars of the upper series, and means independently to carry each of said brackets.

In testimony whereof, I have signed my name to this specification.

CHARLES M. MENDELSOHN.